(12) United States Patent
Jones et al.

(10) Patent No.: US 7,281,142 B2
(45) Date of Patent: Oct. 9, 2007

(54) APPARATUS, SYSTEM, AND METHOD FOR SECURELY PROVIDING POWER SUPPLY COMMANDS

(75) Inventors: Carl Evan Jones, Tucson, AZ (US); Robert Akira Kubo, Tucson, AZ (US); Gregg Steven Lucas, Tucson, AZ (US); Andrew Dale Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 10/935,587

(22) Filed: Sep. 7, 2004

(65) Prior Publication Data
US 2006/0053312 A1    Mar. 9, 2006

(51) Int. Cl.
*G06F 1/00* (2006.01)
(52) U.S. Cl. .................. 713/310; 713/300; 713/320
(58) Field of Classification Search ............... 713/300, 713/310, 320
See application file for complete search history.

(56) References Cited

U.S. PATENT DOCUMENTS

| | | | |
|---|---|---|---|
| 4,322,611 A * | 3/1982 | Edelman ................ 235/383 |
| 6,317,839 B1 | 11/2001 | Wells ................ 713/320 |
| 6,657,534 B1 | 12/2003 | Beer et al. ................ 340/3.1 |
| 2004/0184203 A1 * | 9/2004 | Nagafuchi et al. ............ 361/20 |
| 2004/0268111 A1 * | 12/2004 | Dayan et al. ................ 713/2 |
| 2005/0152379 A1 * | 7/2005 | Hall et al. ................ 370/400 |
| 2005/0289426 A1 * | 12/2005 | Forlenza et al. ............ 714/738 |
| 2006/0259201 A1 * | 11/2006 | Brown ................ 700/291 |

* cited by examiner

*Primary Examiner*—Chun Cao
*Assistant Examiner*—Malcolm D Cribbs
(74) *Attorney, Agent, or Firm*—Kunzler & McKenzie

(57) ABSTRACT

An apparatus, system, and method are disclosed for securely providing power supply commands. A security feature is added to the remote management of power-on and power-off sequences. The feature allows for multiple controller nodes to receive a command to initiate a power sequence. Each controller node possesses a unique identifier. The nodes compare the received command with received commands of other nodes to confirm that each node received identical power commands. The security feature prevents inadvertent power commands from being received and executed by a single controller node. The unique identifier of each node must be provided before execution of the power command occurs.

20 Claims, 4 Drawing Sheets

APPARATUS, SYSTEM, AND METHOD FOR SECURELY PROVIDING POWER SUPPLY COMMANDS

BACKGROUND OF THE INVENTION

1. Field of the Invention

This invention relates to providing commands to a system of devices and more particularly relates to techniques for securely issuing commands across a network to client computer systems to initiate power-on or power-off sequences or execute other system and power management functions.

2. Description of the Related Art

Personal computer systems are well known in the art. They are widely used for providing computer power to many segments of today's modern society. A personal computer may take many forms, including a desktop unit, a standing unit, or a portable microcomputer unit. Typical personal computers are provided with a central processing unit and associated volatile and non-volatile memory, including random access memory and basic input/output system read only memory, a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together.

With personal computers being increasingly connected into networks to allow efficient transfers of data among computers, operations such as maintenance, updating of applications, and data collections are constant and required. Computer networks are also becoming more and more essential to their users. Consequently, it is desirable to minimize loss of productivity by increasing the availability of network resources.

Remote management of client computer systems is currently conducted on both large and medium networks. Management of computer networks is accomplished in many systems by a central network management station which has access to client computer systems in the network for management functions. However, in complex network environments, many of the client systems are turned off at night or at other times when they are not in use, either manually or automatically, by power management circuits. This prevents the network management station from gaining access to the client system, limiting the ability to effectively manage the network. Thus, technology has evolved which allows a remote network management station to wake-up a client system in the network to allow it to conduct network management processes or otherwise communicate with the client system. Such technology is referred to generally as Wake On LAN.

The Wake On LAN feature of network adapter cards in personal computers allows network administrators to remotely boot off-line client systems. One popular technology for implementing the Wake On LAN feature is referred to as the "Magic Packet" technology, developed by Advanced Micro Devices, Inc. One concern that the Wake On LAN feature creates is the potential for intruders acting remotely to power-up unattended systems, and attempt to penetrate them. This danger is more acute than that for on-line systems, from one point of view, because their powered down state can be used as evidence that they are not being monitored for intrusion. Thus, Wake On LAN protocols present an avenue for hackers to gain access through a network to sleeping devices.

The "Magic Packet" technology developed by AMD involves transmission of a special packet which is identified by 16 duplications of the media access control (MAC) address of the client system to be woken up without breaks or interruptions, inside a single packet. The network interface card is adapted to recognize this special packet, and signal the host system that it has received a Wake On LAN command.

One approach to providing security for the Wake On LAN feature involves transmitting a separate packet carrying a password. Before the network interface card issues a command to the host system, it must receive both the special Wake On LAN packet and the special password packet. This approach has a number of drawbacks, including the fact that packets can by snooped by other stations in the network, allowing the password to be learned by other parties. Also, the Wake On LAN packet sequence can be easily replayed by parties attempting to enter the system. In addition, the requirement of two packets requires complicated circuitry in the network interface card, increasing costs. Thus the password packet approach provides limited security at increased costs.

From the foregoing discussion, it should be apparent that a need exists for an apparatus, system, and method that render current Wake On LAN systems more secure. Beneficially, such an apparatus, system, and method would provide a secure means of confirming power control commands before the execution of said commands are carried out.

SUMMARY OF THE INVENTION

The present invention has been developed in response to the present state of the art, and in particular, in response to the problems and needs in the art that have not yet been fully solved by currently available computer networks. Accordingly, the present invention has been developed to provide an apparatus, system, and method for securely issuing commands across a network that overcome many or all of the above-discussed shortcomings in the art.

The apparatus to securely provide power supply commands is provided with a logic unit containing a plurality of modules configured to functionally execute the necessary steps of securely providing commands across a network. These modules in the described embodiments include a command module configured to provide the power supply commands, a plurality of independent controller nodes configured to receive the power supply commands, and a receiver module configured to confirm that each controller node received identical power supply commands.

The apparatus, in one embodiment, is configured to provide the power control commands from a remote location. Each independent controller node comprising the plurality of nodes comprises a network interface connection, such as a network interface card. The network interface connection is configured to receive the power supply commands wirelessly. A unique identifier is assigned to each network interface connection. In one embodiment, the unique identifier is the media access control (MAC) address.

The apparatus is further configured, in one embodiment, to provide commands to initiate power-off sequences to a processing module. The processing module may be further configured to manage power control commands to power down the system of devices. The processing module is also configured to confirm that each independent node received identical power control commands to power down the system. The processing module may also be configured to provide commands to power-off the power supply of the system to the receiver module.

A system of the present invention is also presented to provide commands to a system of devices. The system may be embodied to securely provide power control commands to a system of devices. In particular, the system, in one embodiment, includes a user interface configured to provide the power control commands, a plurality of independent controller nodes configured to receive the power control commands, and a control processor configured to confirm that each controller node received identical power control commands.

The system may further include a network interface connection for each independent controller node. Each network connection is identified by a unique identifier. In one embodiment, the user interface provides the unique identifier of each network interface connection of each controller node. The control processor is configured to confirm that each controller node has received identical power control commands.

The system may further include a processing complex configured to provide commands to power-off the power supply to the control processor. The processing complex may also be configured to execute a primary shut down sequence such as quiescing data transfers, shutdown of functional code, and shutdown application code, and the operating environment.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
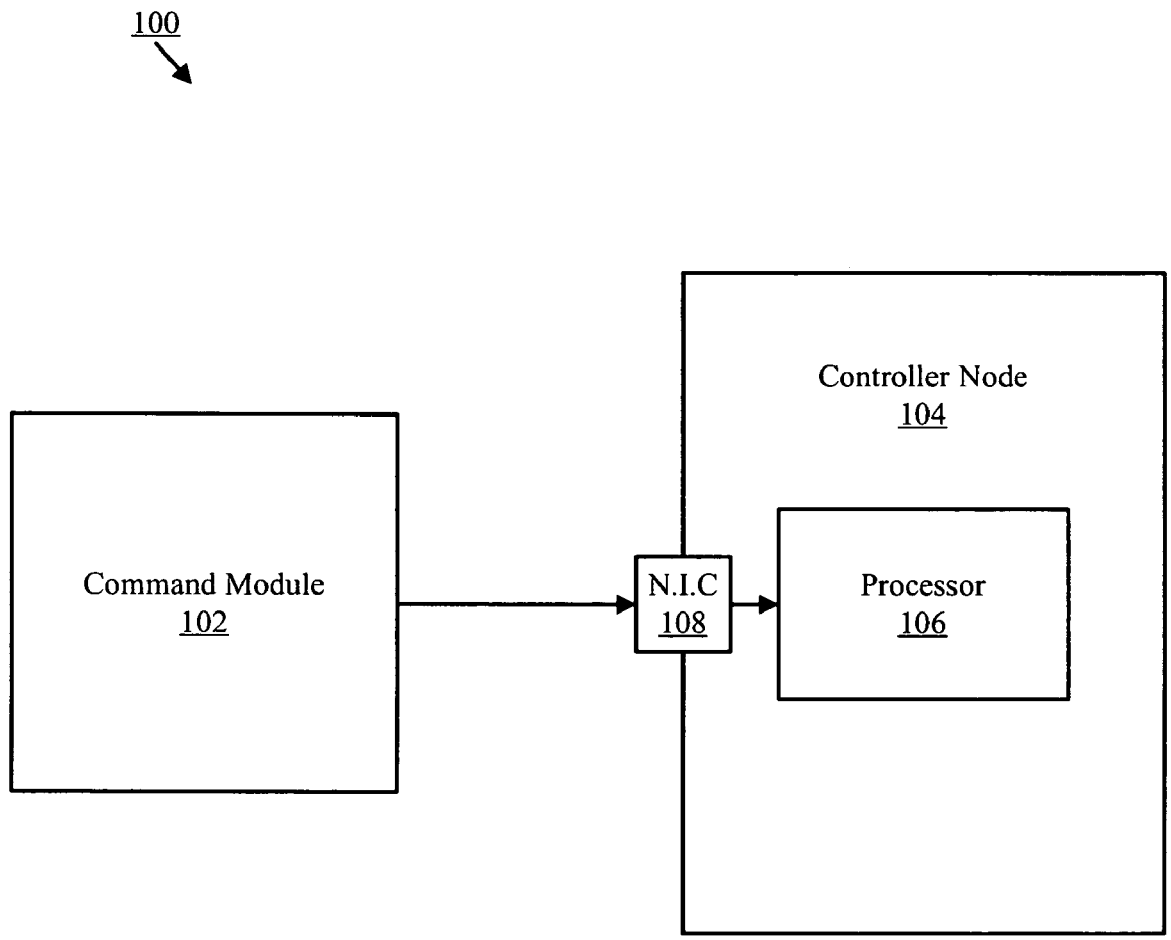
FIG. 1 is a schematic block diagram illustrating one embodiment of a power supply apparatus of the prior art.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 depicts a power command apparatus 100 of the prior art. The apparatus 100 facilitates a command module 102 to provide commands to a controller node 104 within a system of networked computerized devices. The commands may include commands to initiate power-on and power-off sequences of the power supply to the system of devices. The command module 102 may include a user interface such as a computer terminal, laptop, and the like. The system of devices may include one or more computer terminals, servers, and the like.

The command module 102 may provide the command to the controller node 104 by way of a network interface connection 108. The connection 108 may receive the commands from the command module 102 by way of an Ethernet connection, wireless connection, or the like. The command module 102 may specify which controller node 104 the command is to be sent to by providing an address corresponding to the network interface connection 108. The address may include the media access control (MAC) address.

The network interface connection 108 may transmit the command to a processor 106 within the controller node 104. In one embodiment, the processor 106 includes a management and control processor that receives and executes the command. For example, the network interface connection 108 transmits the command to initiate a power-on or power-off sequence. The processor 106 receives the command and activates the sequence to provide the power supply to the system of devices, or activates the sequence to shut down the power supply to the system of devices.

In one embodiment, more than one command module may be used to provide a command to initiate a power supply sequence by entering the correct MAC address of the network connection 108. In this arrangement, a command module may inadvertently provide an incorrect MAC address and subsequently provide a command to a different controller node that may be located within a different system of devices. Absent the present invention, the command would be executed and the incorrect system of devices would have the power supply activated or deactivated.

Figure 2:
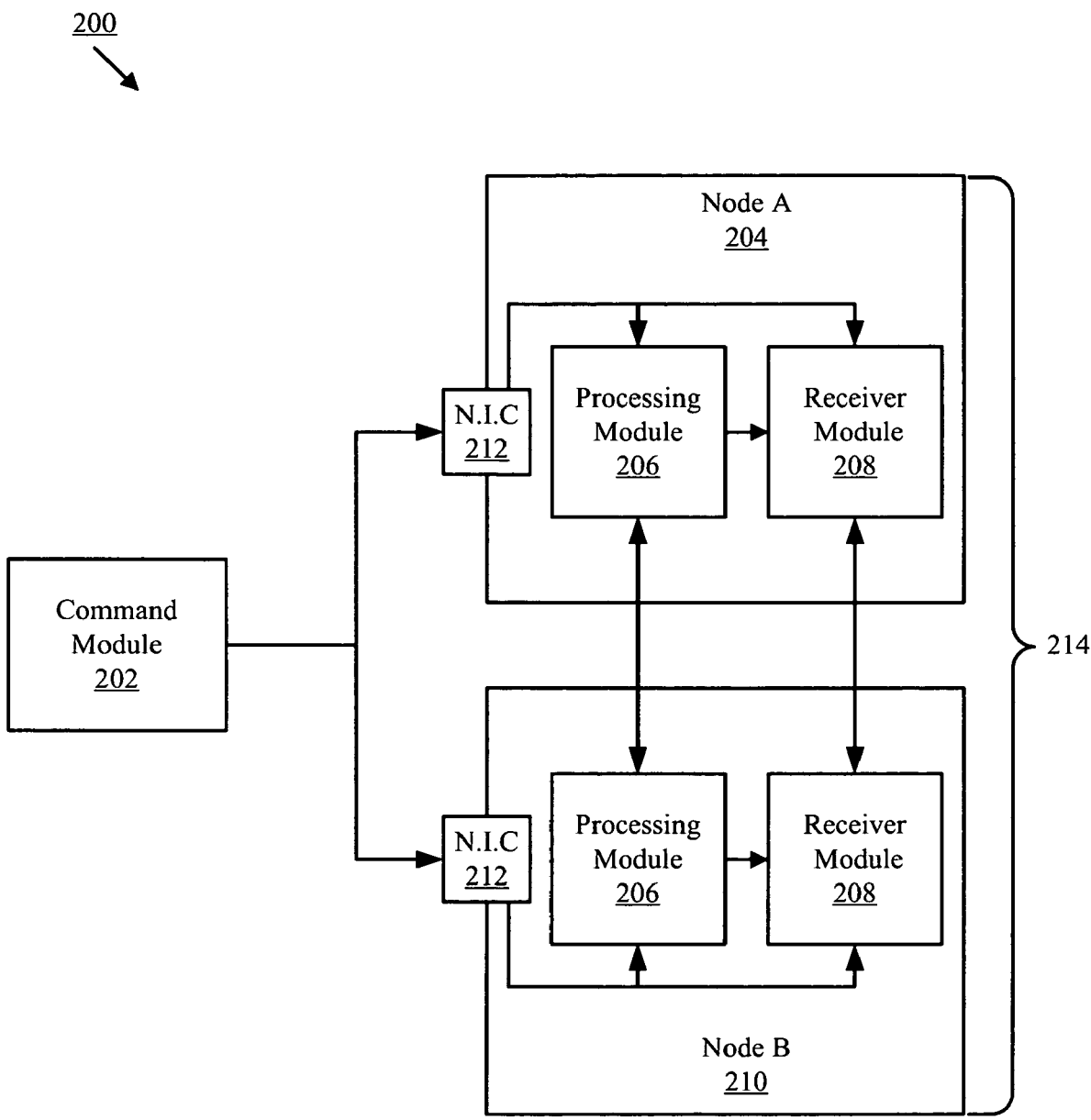
FIG. 2 is a schematic block diagram illustrating one embodiment of a power command security apparatus in accordance with the present invention.

FIG. 2 depicts a power command security apparatus 200. The apparatus 200 facilitates a command module 202 to provide power commands to a plurality of independent nodes 214 of a system of networked computerized devices in order to initiate power sequences within the system. The apparatus 200 further facilitates preventing a source other than the command module 202 from activating a power command. Other synchronized operations may be conducted in a similar manner. Each independent node comprising the plurality of nodes 214 must receive identical power commands before the command is executed. The command module 202 must identify each controller node within the plurality of nodes 214 and send the identical power command to each identified node. The power commands may be commands to activate the power-on or power-off sequence within the system. The power-on sequence may include a sequence to provide power to a system of devices while the power-off sequence may include a sequence to deactivate the power supply to a system of devices. The system of devices may include a computer terminal, a server, or the like.

The command module 202 may include a user interface such as a computer terminal, laptop, or the like, and may be located in a remote location from the system of devices and provide the power command wirelessly. In one embodiment, the command module 202 sends the power command to the plurality of nodes 214. A network interface connection 212 may initially receive the power command provided by the command module 202. Each single node, including node A 204 and node B 210, comprising the plurality of nodes 214, may include a network interface connection 212 with a unique identifier. The command module 202 may specify the single nodes within the plurality of nodes 214 and send the power commands to the specified nodes by providing the unique identifier of network connection 212 associated with each node. For example, the command module 202 may provide a power command to a system of devices comprising node A 204 and node B 210. The command module 202 is required to provide the unique identifier for the network connection 212 of node A 204 and node B 210 respectively. In one embodiment, the unique identifier is the media access control (MAC) address. The unique identifier of the network connection 212 of each single node facilitates the command module 202 to identify each node within the plurality of nodes 214.

The network interface connection 212 of each node may then transmit the power command to a processing module 206 or a receiver module 208 located within each controller node 204 and 210. The processing module 206 may include a processing complex that receives and manages commands to initiate the power-off sequences. The receiver module 208 may include a management control processor that receives and manages commands to initiate the power-on sequences. In one embodiment, the receiver module 206 confirms that each single node within the plurality of nodes 214 has received the identical power command before the command is executed.

The processing module 206 of a single node may communicate with the processing module 206 of additional nodes within the plurality of nodes 214. This communication facilitates confirming whether each additional node within the plurality of nodes 214 has received the identical power command. For example, the processing module 206 of node A 204 may receive a command to initiate a power-off sequence from the network connection 212. The processing module 206 of node A 204 communicates with the processing module 206 of node B 210 to confirm if the processing module of node B 210 received an identical power command from the network connection 212. If the processing modules 206 of node A 204 and node B 210 received identical commands, a power-off sequence may be activated. The processing module 206 may initiate a power-off sequence that includes quiescing the interfaces, destaging the data, and placing the data on non-volatile mediums. The power-off sequence may also include shutting down functional code, micro code, and application code.

The processing module 206 may further communicate the command to power-off the power supply to the receiver module 208. Communicating the power command to shut down the power supply to the receiver module 208 allows the receiver module 208 to confirm whether the receiver modules 208 of additional nodes have received the identical command. For example, the processing module 206 of node A 204 may communicate a received power-off sequence to the receiver module 208 of node A 204. Similarly, the processing module 206 of node B 210 may communicate a received power-off sequence to the receiver module 208 of node B 210. The receiver modules 208 of node A 204 and node B 210 communicate to confirm whether each receiver module 208 has received identical commands to power-off the power supply.

The receiver module 208 of a single node may further receive a power command to initiate a power-on sequence from the network connection 212. The receiver module 208 may communicate with the receiver modules 208 of additional controller nodes within the plurality of nodes 214 to confirm whether each receiver module 208 has received the identical power command. For example the command module 202 may provide a command to initiate a power-on sequence to a system of devices comprising node A 204 and node B 210. The command module 202 provides the MAC address of each network connection 212 corresponding to node A 204 and node B 210. The network connection 212 of each node transmits the command to the receiver modules 208 of node A 204 and node B 210. The receiver modules 208 of each node communicate with each other to confirm that each node has received an identical command to activate a power-on sequence. If each independent node within the system of devices has not received identical commands to activate a power-on sequence, the sequence will not be executed.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbology employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
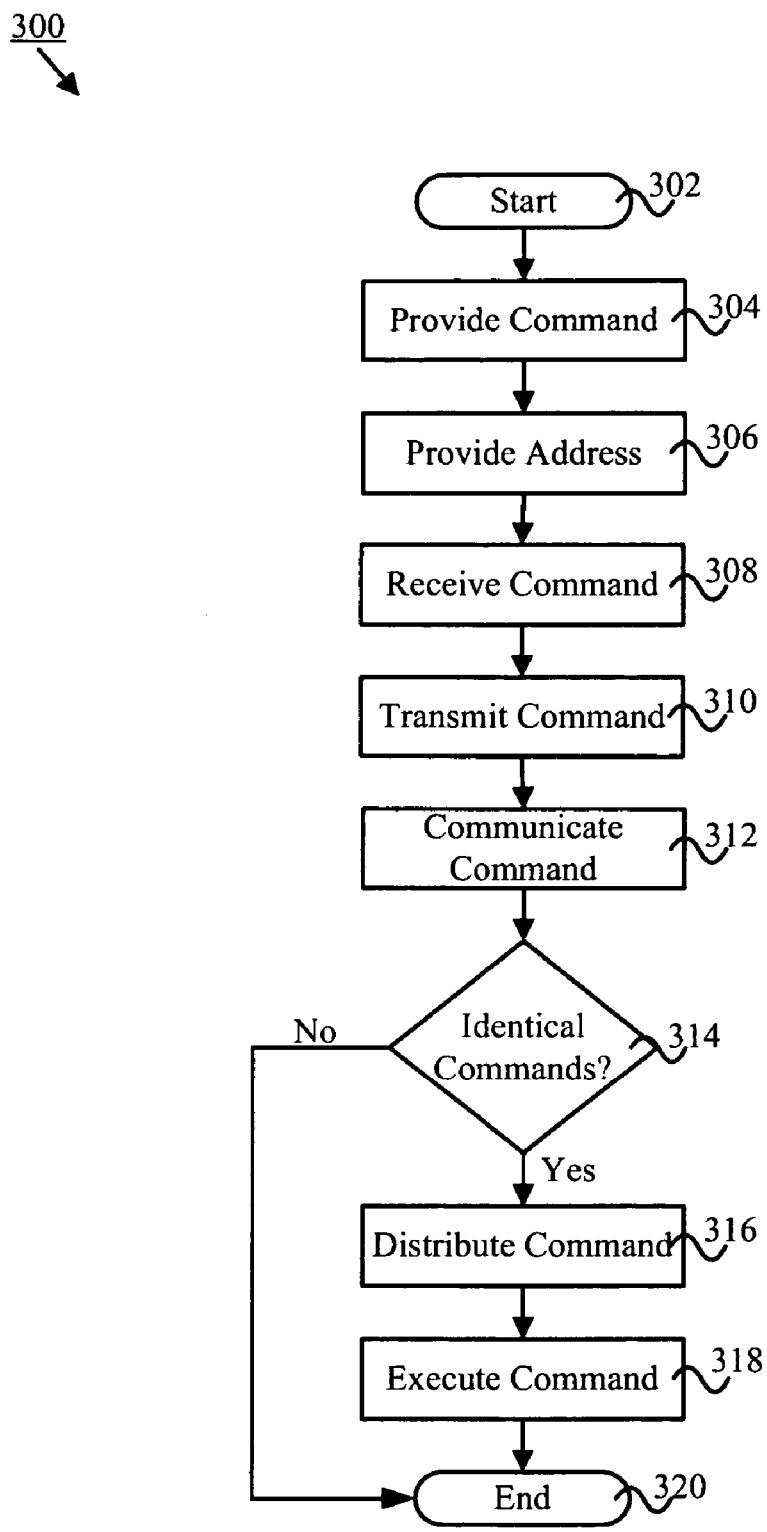
FIG. 3 is a schematic flow chart diagram illustrating one embodiment of a power activation method in accordance with the present invention.

FIG. 3 depicts a power activation method 300. The method 300 provides a secure manner of activating a power-on sequence within a system of devices. The method 300 starts 302 and a command is provided 304. The command module 202 may provide the command. In one embodiment, the command initiates a power-on sequence. The method 300 continues and an address is provided 306. In one embodiment, the command module 202 provides the address of the network connection 212 of a specific controller node within the system of devices. The address may be a unique identifier such as the MAC address. For example, the command module 202 may provide a command 304 and the MAC address 306 of a specific node. The command is then received 308 by the network connection 212 of a particular controller node specified by the MAC address. In one embodiment, multiple MAC addresses are provided 306 and the command is received 308 by each network connection 212 with the corresponding MAC address.

The method 300 continues and the command is transmitted 310 to the receiver module 208. The receiver module 208 then communicates 312 with additional receiver modules 208 within each controller node. The receiver module 208 then communicates with the additional receiver modules 208 in order to confirm 314 whether each additional receiver module 208 has received the identical command. Additional receiver modules 208 receive the command if the command module 202 provides the MAC address of the network connection 212 transmitting the command.

When it is determined that the additional receiver modules 208 have received the identical power command 314 from the corresponding network connection 212, the method 300 continues and the receiver modules 208 distribute the command 316 to the system of devices. The receiver module 208 executes 318 the command and the power-on sequence is activated. However, if the additional receiver modules 208 have not received an identical command at the command confirmation step 314, the method ends 320 and the command is not distributed or executed.

Thus, for example, if a command to activate a power-on sequence is provided to the network connection 212 of node A 204, the command module 202 must also provide the MAC address of the network connection 212. In order for the power-on sequence to be executed, each controller node within the system of devices must receive the identical command. The command module 202 must also provide the command and MAC address of the network connection 212 of node B 210. If each controller node receives the identical command, the power-on sequence is activated and power is supplied to the system of devices.

Figure 4:
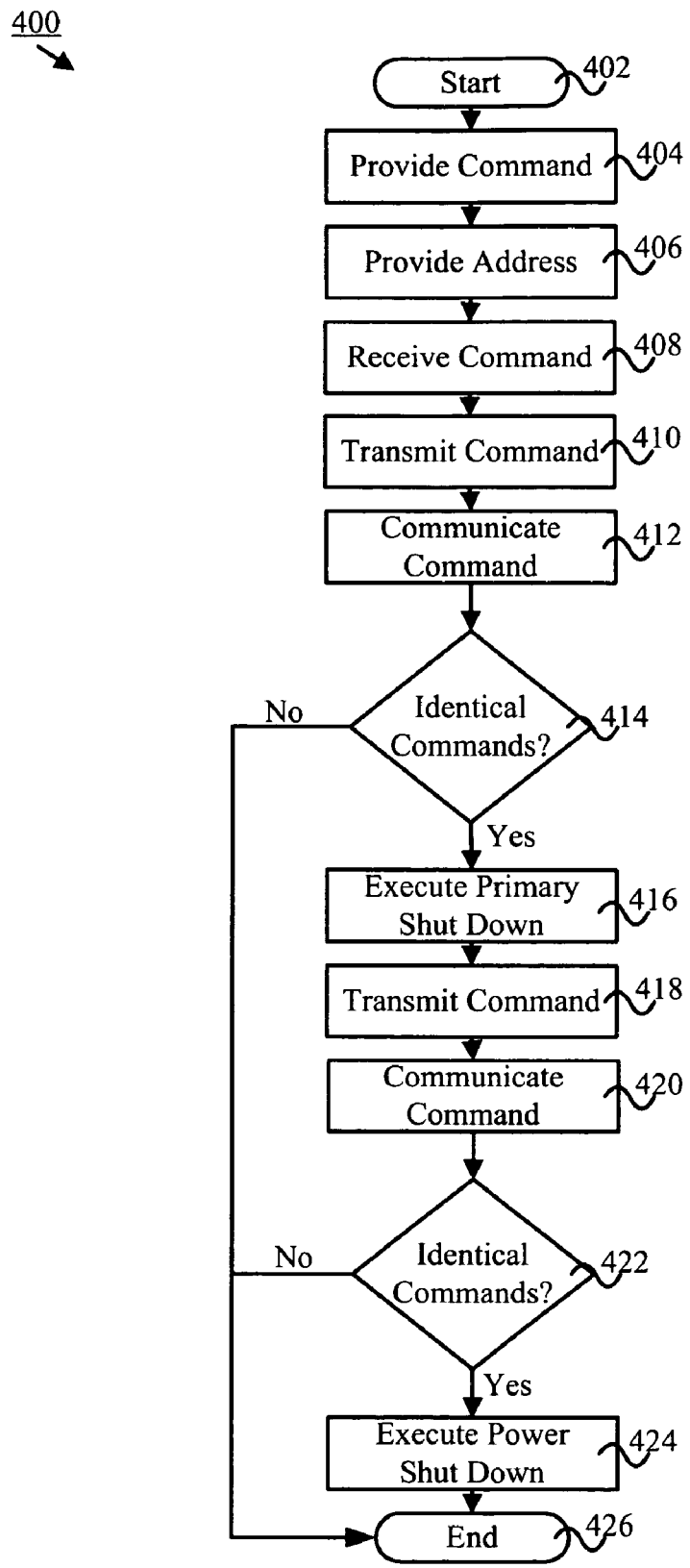
FIG. 4 is a schematic flow chart diagram illustrating one embodiment of a power deactivation method in accordance with the present invention.

FIG. 4 depicts a power deactivation method 400. The method 400 provides a secure manner of activating a power-off sequence within a system of devices. The method 400 starts 402 and a command is provided 404. The command may be provided by the command module 202. The method 400 continues and an address is provided 406. In one embodiment, the command module 202 provides the address of the network connection 212 of a specific controller node within the system of devices. The address may be a unique identifier such as the MAC address. For example, the command module 202 may provide a command and the MAC address of a specific controller node. The command is received 408 by the network connection 212 of the particular controller node specified by the MAC address. In one embodiment, multiple addresses are provided 406 and the command is received 408 by each network connection 212 with the corresponding MAC address.

The method 400 continues and the command is transmitted 410 to the processing module 206. The processing module 206 communicates 412 with additional processing modules 206 within each controller node. The processing module 206 communicates the command with the additional processing modules 206 in order to confirm 414 whether each additional processing module 206 has received an identical command. Additional processing modules 206 receive the command if the command module 202 provides the MAC address of the network connection 212 transmitting the command.

If each additional processing module 206 has received the identical command from the corresponding network connection 212, the method 400 continues and the processing modules 206 execute 416 the command. In one embodiment, the processing modules 206 execute a primary shut down of the system of devices. The primary shut down may include quiescing the interfaces, destaging the data, and placing the data onto non-volatile mediums. The primary shut down may also include the shut down of the functional code, micro code, and application code of the system of devices. However, if each additional processing module 206 did not receive an identical command at the command confirmation step 414, the method ends 426 and the command is not executed. For example, the command module 202 may provide a command 404 and a MAC address 406 corresponding to the network connection for node A 204, but fail to provide the correct MAC address for the network connection 212 corresponding to node B 210. The processing module 206 of node A 204 is then unable to confirm that the processing module 206 of node B 210 received an identical command to initiate a power-off sequence and the method 400 ends 426.

After the execution 416 of a primary shut down, the processing module 206 transmits 418 the command. In one embodiment, the command is transmitted to the receiver module 208. The receiver module 208 communicates the command 420 with each additional receiver module 208 within each controller node. If each receiver module 208 confirms the receipt of an identical command, the command is executed 424. In one embodiment, the executed command is the shut down of the power supply to the system of devices. However, if the second command confirmation step 422 concludes that each receiver module 208 did not receive identical commands, the method 400 ends 426 and the power supply to the system of devices is not shut down.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to securely provide power commands to a system, the apparatus comprising:
    a command module configured to provide power commands to the system, wherein the power commands consist of a power up command and a power down command;
    a plurality of independent nodes configured to receive power commands, wherein each independent node comprises a network connection; and
    a receiver module configured to confirm that each node in the plurality of nodes has received identical power commands and execute the power commands if each power command is identical.

2. The apparatus of claim 1, wherein the command module further comprises providing power commands remotely.

3. The apparatus of claim 1, wherein each network connection further comprises a unique identifier.

4. The apparatus of claim 3, wherein the command module is configured to provide the unique identifier for each network connection.

5. The apparatus of claim 1, further comprising a processing module configured to manage power commands to power down the system.

6. The apparatus of claim 5, wherein the processing module is further configured to confirm that each node has received identical power commands to power down the system.

7. The apparatus of claim 5, wherein the processing module is further configured to provide commands to the receiver module to power-off a power supply of the system.

8. A system to securely provide power commands to a system of devices, the system comprising:
    a user interface configured to provide the power commands, wherein the power commands consist of a power up command and a power down command;
    a plurality of independent controller nodes configured to receive power commands, wherein each independent controller node comprises a network connection; and
    a control processor configured to confirm that each controller node has received identical power commands and execute the power commands if each power command is identical.

9. The system of claim 8, wherein the user interface provides the power commands to the system of devices from a remote location.

10. The system of claim 8, wherein each network interface connection comprises a unique identifier.

11. The system of claim 8, wherein the user interface is configured to provide the unique identifier of each network interface connection of each controller node.

12. The system of claim 8, wherein the control processor is configured to confirm that each controller node has received identical power commands.

13. The system of claim 8, wherein each controller node comprises a control processor.

14. The system of claim 8, further comprising a processing complex configured to provide commands to power-off the power supply to the control processor.

15. The system of claim 8, wherein each controller node comprises a processing complex.

16. The system of claim 10, wherein the unique identifier comprises a media access control address.

17. A computer readable storage medium comprising computer readable program code for receiving power commands for a system of devices, the program code configured to:
    compare power commands received at each of a plurality of controller nodes from a user interface, wherein the power commands consist of a power up command and a power down command and each controller node comprises a network connection;
    confirm that the power commands received by each controller node are identical; and
    execute the power commands if each power command is identical.

18. The apparatus of claim 5, wherein the processing module is further configured to quiesce interfaces, destage data, and place data onto non-volatile mediums.

19. The system of claim 14, wherein the processing complex is further configured to quiesce interfaces, destage data, and place data onto non-volatile mediums.

20. The computer readable storage medium of claim 17, wherein the program code is further configured to quiesce interfaces, destage data, and place data onto non-volatile mediums.

* * * * *